Patented May 28, 1946

2,400,925

UNITED STATES PATENT OFFICE 2,400,925

LUMINESCENT MATERIAL

Wayne O. Graff, University Heights, Ohio, assignor to General Electric Company, a corporation of New York No Drawing. Application October 23, 1943,
Serial No. 507,457

7 Claims. (Cl. 252—301.6)

This invention relates to a combination of a luminescent material or phosphor with a source of exciting radiation, and includes a novel type of phosphor. In forms hereinafter more particularly described, the phosphor is excited both by cathode rays and by X-rays, as well as by ultraviolet radiation, particularly short-wave ultraviolet such as 2537 Å., the resonance radiation of mercury, and also long-wave ultraviolet such as 3650 Å., and emits visible light of a pink hue, with a lingering pinkish phosphorescence or afterglow. When the phosphor has been excited by cathode rays, this after phosphorescence may persist for a couple of seconds; when the excitation has been by short-wave ultraviolet (e. g., 2537 Å.), the phosphorescence may persist for a period of minutes. The long-wave ultraviolet excitation (e. g., 3650 Å.) results in after-phosphorescence of intermediate duration. For excitation by short-wave ultraviolet, the phosphor may be internally coated on the envelope surface of a fluorescent lamp of the ordinary low-pressure positive column type, such as that disclosed in U. S. Patent 2,259,040 to Inman.

Phosphors consist in general of a major proportion of a so-called base material or matrix and a minor proportion of another material called an activator. Several activators may coact in the fluorescence of a phosphor, and may cooperate to produce effects which could not be expected from the emissions which they would produce singly in the matrix material. The radiation of a phosphor when excited depends on the relations between matrix and activator materials, as largely determined by heat-treatment which they undergo together, as well as on the materials themselves and their relative proportions. Apparently it is metal that serves as activator in a phosphor, although this metal is usually present as a compound.

Forms of phosphor hereinafter described comprise a matrix of metal compound, particularly a cadmium compound, and especially a borate or a silicate, with a main color-determinative activator of fluorescence, and a supplemental activator that produces or prolongs phosphorescence of the phosphor, i. e., an afterglow when it is no longer acted on by any exciting radiation. The main activator of fluorescence in the phosphors that are here described is manganese, and the supplemental activator is bismuth or tin. One such form of the phosphor has its peak of fluorescent intensity at about 6250 Å., with about 90 per cent of its total emission between 5700 Å and 6800 Å., so that its apparent fluorescent hue is a rather definite pink, while its afterglow or phosphorescence is more of an orange-pink. In practice, the exact composition of the phosphor may vary according to the intensity of fluorescence and phosphorescence desired, according to the persistence of phosphorescence that is required, and according to the methods of preparation and processing or heat treatment that are employed. In general, the raw materials for the phosphor should be of the high purity customarily used in preparing phosphors, and preferably of at least C. P. grade; and when silicic acid is used, a grade with a content of 85–95 per cent $SiO_2$ is very suitable.

In the composition of the phosphor, the mole ratio between cadmium oxide and the other radical of the matrix, such as $B_2O_3$ or $SiO_2$, may depart from the theoretical stoichiometric proportions based on the supposed chemical formula of the matrix material; and such variation has even been found to be beneficial in some cases, giving a phosphor of greater brightness. But while the matrix mole ratios which have been found most advantageous are indicated hereinafter, this is not to be understood as any definite limitation against departure from the ratios indicated, not even rather wide departures. Without attempting to state just what are the activating relations of the main and supplemental activators to the matrix material, or their relations to one another, it is of interest to remark that the activating metals seem to be present in the phosphor as compounds of the same type as the matrix, e. g., borates or silicates, or possibly as oxides. It is also of interest to note that while manganese alone is an activator of visible fluorescence for the matrices herein referred to, bismuth or tin alone produces neither fluorescence nor phosphorescence, notwithstanding that in combination with manganese these substances do produce an afterglow or phosphorescence as already stated.

It is, of course, to be understood that the phosphors here disclosed may be combined or mixed with other phosphors in use, as well as with diluent or other substances of various kinds.

In compounding my phosphor, the raw batch may be prepared by evaporating a single solution of the several ingredients, or by coprecipitation from solution, or by mixing the components in powdered or granular form and grinding them together, as in a ball-mill. In a matrix of cadmium borate, the mole ratio of $CdO:B_2O_3$ may vary from 1 to 3 or more: i. e., the cadmium oxide CdO may be in excess of the stoichiometric proportion according to the formula $CdB_2O_4$.

For mole ratios of $CdO:B_2O_3$ up to 1.8 or even 2, the matrix is generally a mixture of the metaborate $CdB_2O_4$ with an excess of cadmium oxide, CdO; but at a mol ratio of 3, the matrix material generally consists substantially of the orthoborate, $Cd_3B_2O_6$, which may tend to give a phosphor of inferior brightness. The proportions of the activators may be varied over a considerable range: e. g., manganese as main activator from a mere trace up to an amount which would tinge or discolor the desired pure white of the phosphor during firing of the batch materials to bring the activator into activating relation to the matrix material, and bismuth or tin as supplemental activator from a trace up to an amount which would flux the phosphor and thus bring about its fusion during the firing. A typical composition for the finished phosphor would be:

| | |
|---|---|
| $CdO:B_2O_3$ mole ratio | 1.8 |
| Mn per cent by weight | .3 |
| Bi do | .1 |

In preparing the raw batch according to the solution method, which has so far given the best cadmium borate phosphor, 2500 g. of cadmium nitrate tetrahydrate, $Cd(NO_3)_2 \cdot 4H_2O$, is dissolved in distilled water, and the solution is brought to a boil and kept boiling. While boiling is continued, there are added and dissolved in the solution 490 g. of ammonium pentaborate as it is commercially known, corresponding approximately to the formula $(NH_4)_2O \cdot 5B_2O_3 \cdot 8H_2O$; 8.5 g. of manganese carbonate, $MnCO_3$; and 2.04 g. of bismuth trichloride, $BiCl_3$. The solution is boiled away and evaporated to dryness, and the residue is heated at about 600° C. for several hours, thus decomposing the nitrate and forming the metal borate. The product is then ground, as in a ball-mill, until the particles will pass a 100 to 200 mesh screen, and is fired to "form" the phosphor and develop maximum brightness. For this purpose, the batch may be heated or calcined in an open refractory crucible (as of procelain, silica, or alundum), in a refractory electric muffle furnace open to the air. Firing for two hours at about 800° C. has been found to give good results; though firing at temperatures as low as 700° C. or even 600° C. will produce a phosphor if long enough continued, and the temperature may go as high as 900° C. if the particular batch or mix will stand it without fusion, and need not then be held so long as two hours. A batch much larger than according to the foregoing description might require longer firing, while a smaller batch might allow of shortening the firing time. After cooling, the product may be ground, as by ball-milling, and screened to proper size for application to a discharge device wall in the usual manner.

Tin in either stannous or stannic condition may be used as a supplemental activator in lieu of bismuth, by merely substituting an equivalent amount of a suitable tin compound (such as stannous chloride, $SnCl_2$ or stannic oxide, $SnO_2$) for the bismuth trichloride mentioned above.

Cadmium silicate activated with manganese and bismuth or tin may be prepared in a way similar to that described above for the preparation of cadmium borate phosphor, and is more stable than the latter, as well as easier to prepare, though its brightness under 2537 A. excitation is not so good. In the case of the cadmium silicate matrix, the mole ratio of $CdO:SiO_2$ may preferably be about 1:1, in accordance with the formula $CdSiO_3$ for cadmium metasilicate. The composition of a raw batch for the dry mixing method referred to above, which has so far given the best cadmium silicate phosphor, may be as follows by weight:

| | |
|---|---|
| Cadmium oxide (CdO) g | 642 |
| Silicic acid ($SiO_2 \cdot xH_2O$) to give silica ($SiO_2$) g | 300 |
| Manganese carbonate ($MnCO_3$) g | 2 |
| Bismuth trichloride ($BiCl_3$) g | 4 |
| Lithium chloride (LiCl), as flux g | 30 |

These ingredients may be mixed together dry in a fine state of division, thorough intermixture being assured or completed by ball-milling the dry mix for about 1 hour in a 2 gallon ball-mill. The batch may then be heated or calcined in the same manner as described above for the final heating step in the production of cadmium borate phosphor, at a temperature of about 600 to 900° C., and for a length of time depending both on the temperature and on the size of the batch. Firing for two hours at about 800° C. gives good results for a batch of about 900 to 1000 grams such as that of the formula above. A much larger batch or a lower temperature might require longer firing, while a smaller batch or a higher heat might allow of reducing the firing time. To assure optimum brightness of the phosphor thus produced, it may be reground (as in a ball-mill) for about an hour and then refired for about the same length of time and under the same conditions as in the initial firing, thus bringing about reaction of particles of the batch ingredients that failed to react in the first firing for any reason. Such refiring is especially indicated in the case of phosphors whose brightness falls below the usual and expected level. After the firing is completed and the phosphor has cooled, it may be ground, as by ball-milling, and screened to proper size for application to a discharge device wall.

In the case of the cadmium silicate phosphor, a flux (such as lithium chloride in the above formula) seems to improve the reaction of the batch ingredients or the activating combination of the activator with the matrix material, though apparently it is of no benefit in the case of the cadmium borate phosphor. About 3 per cent of flux as in the formula has been found to be very effective in most cases, though considerably greater amounts may be used, if desired for any reason: e. g., I have used as much as 5 per cent without any apparent disadvantage.

While the dry mix method is easiest, and has seemed to give best results in the case of cadmium silicate phosphors, they may also be prepared by the wet methods of evaporation or precipitation from solutions that have been referred to above.

What I claim as new and desire to secure by Letters Patent of the United States is:

1. Phosphor comprising a matrix of material of the group consisting of cadmium borate and cadmium silicate activated with a color-determinative activator of fluorescence and cooperating phosphorescence-prolonging activator material of the group consisting of bismuth and tin, and characterized by visible fluorescence with pinkish after phosphorescence under both ultraviolet and cathode ray excitations.

2. Phosphor comprising a matrix of material of the group consisting of cadmium borate and cadmium silicate activated with manganese and co-operating phosphorescence-prolonging activator material of the group consisting of bismuth and tin, and characterized by pink fluorescence with pinkish persistence of phosphorescence under both ultraviolet and cathode ray excitations.

3. Phosphor comprising a matrix of cadmium borate activated with manganese and co-operating phosphorescence-prolonging activator material of the group consisting of bismuth and tin.

4. Phosphor having a matrix material comprising cadmium silicate, and activated with a color-determinative activator and co-operating phosphorescence-prolonging activator material of the group consisting of bismuth and tin.

5. Phosphor comprising a matrix of cadmium silicate activated with manganese and co-operating phosphorescence-prolonging activator material of the group consisting of bismuth and tin.

6. Phosphor comprising a matrix of cadmium metaborate and cadmium oxide, wherein the mole ratio of cadmium oxide to boric oxide is of the order of 1.8:1 to 2:1, activated with manganese and co-operating activator material of the group consisting of bismuth and tin.

7. Phosphor comprising a matrix of cadmium orthoborate activated with manganese and co-operating activator material of the group consisting of bismuth and tin.

WAYNE O. GRAFF.